(12) United States Patent
Shimizu et al.

(10) Patent No.: US 6,373,155 B1
(45) Date of Patent: Apr. 16, 2002

(54) PROPULSION UNIT OF VEHICLE (75) Inventors: Michinori Shimizu; Yoshiaki Omata; Kazuhiko Morimoto; Hiroshi Ohsawa, all of Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/655,806

(22) Filed: Sep. 6, 2000

(30) Foreign Application Priority Data

Sep. 6, 1999  (JP) ............................ 11-251212

(51) Int. Cl.[7] .................. H02K 11/00; H02K 9/20; H02K 9/00; H02K 5/10; H02K 5/12; H02K 1/12
(52) U.S. Cl. .................. 310/68 B; 310/54; 310/58; 310/85; 310/254
(58) Field of Search ............... 310/68 B, 254; 318/254, 439, 139

(56) References Cited

U.S. PATENT DOCUMENTS

| 3,845,372 A | * | 10/1974 | Ringland et al. ............ 318/398 |
| 4,694,688 A | * | 9/1987 | Takahashi et al. ............ 73/116 |
| 4,888,509 A | * | 12/1989 | Tomasek ..................... 310/42 |
| 4,924,674 A | * | 5/1990 | Hara et al. .................... 60/608 |
| 4,955,944 A |   | 9/1990 | Aso et al. ................... 123/41.31 |
| 4,958,095 A | * | 9/1990 | Uchida et al. ................ 310/59 |
| 5,111,098 A | * | 5/1992 | Peck et al. .................. 310/268 |
| 5,172,006 A | * | 12/1992 | Suzuki et al. ................ 290/45 |
| 5,300,884 A | * | 4/1994 | Maestre ................... 324/207.25 |
| 5,325,005 A | * | 6/1994 | Denk ...................... 310/68 B |
| 5,444,369 A | * | 8/1995 | Luetzow .................. 324/207.2 |
| 5,793,132 A |   | 8/1998 | Hirose et al. ................. 310/71 |
| 5,866,965 A | * | 2/1999 | Baronosky et al. ......... 310/208 |
| 6,073,713 A | * | 6/2000 | Branderburg et al. ...... 180/65.2 |
| 6,075,371 A | * | 6/2000 | Kitamura ................... 324/716 |

FOREIGN PATENT DOCUMENTS

| JP | 63-198556 | 8/1988 |
| JP | 7-170688 | 7/1995 |
| JP | 9-19104 | 1/1997 |
| JP | 11-78558 | 3/1999 |

* cited by examiner

Primary Examiner—Nestor Ramirez
Assistant Examiner—Julio Gonzalez R.
(74) Attorney, Agent, or Firm—Flynn, Thiel, Boutell & Tanis, P.C.

(57) ABSTRACT

In a propulsion unit of a vehicle, a rotational displacement detection mechanism is covered or shielded from magnetic flux and radio wave noise which leak from the dynamotor to reduce noise occurring in a signal of the rotational displacement detection mechanism. A magnetic-proof member is disposed between the dynamotor and the rotational displacement detection mechanism in order to shield the mechanism from magnetic flux and/or the radio wave noise.

13 Claims, 9 Drawing Sheets

PROPULSION UNIT OF VEHICLE

FIELD OF THE INVENTION

This invention relates to a propulsion unit of a vehicle and more particularly, to a vehicle propulsion unit whose engine, which is driven by combustion of fuel, is provided with a dynamotor which is driven by electrical energy and functions as a generator.

BACKGROUND OF THE INVENTION

In vehicles, there is a so-called hybrid vehicle whose engine, which is driven by combustion of fuel, is provided with a dynamotor which is driven by electrical energy and functions as a generator (a motor). The dynamotor includes a motor rotor, which turns with a crankshaft of the engine, and a motor stator (coil), which is disposed for correspondence to the motor rotor.

This hybrid vehicle is provided with an engine control means and a motor control means, which respectively control the operating state of the engine and the dynamotor. While driving, the engine control means and the motor control means detect the operating state of the engine and the dynamotor, as well as control the operating state of the engine and the dynamotor depending upon a running state of the vehicle. This enables the hybrid vehicle to achieve a high level of engine performance in terms of fuel consumption, harmful exhaust component value, and engine power.

In addition, this hybrid vehicle is provided with a rotational displacement detection mechanism (a sensor), which detects rotational displacement of the motor rotor to the motor stator.

The rotational displacement detection mechanism includes a sensor rotor which turns with the crankshaft and a stator which corresponds to the sensor rotor (coil).

Several examples of such a construction of a dynamotor and a motor are disclosed in e.g., Patent Laid-Open No. Hei 11-78558 bulletin, Patent Laid-Open No. Hei 9-19104 bulletin, Patent Laid-Open No. Hei 7-170688 bulletin, and Patent Laid-Open No. Showa 63-198556 bulletin.

According to the above Patent Laid-Open No. Hei 11-78558 bulletin, a shielding member is disposed between an engine and a dynamotor, and a partition, which functions as a shielding member, is provided between the dynamotor and a flywheel.

According to the above Patent Laid-Open No. Hei 9-19104 bulletin, in an electric wheel motor, measures are taken to maintain signal lines water-proof and dust-tight.

According to the above Patent Laid-Open No. Hei 7-170688 bulletin, in a spindle motor, two openings or pores are formed for whirl-stopping of a disc in a rotor hub.

According to the above Patent Laid-Open No. Showa 63-198556 bulletin, a cooling water passage is formed so as to direct cooling water to cool an armature coil and a field coil.

However, the dynamotor such as that disclosed in the above Patent Laid-Open. No. Hei 11-78558 bulletin involves inconveniences. There is only a narrow slit between a position detection sensor, which functions as a rotational displacement detection mechanism, and a stator. Therefore, magnetic flux and radio wave noise, which leak from the stator of the dynamotor, negatively influence the position detection sensor. As a result, noise occurs in the signal of the position detection sensor.

In addition, although a rotor and a flywheel are disposed by means of a location pin, there are no means to determine where to dispose the detection sensor and a drive plate in which a pore is formed. This brings about an inconvenience of precisely aligning the position of the detection sensor and the drive plate.

Further, although the rotor is provided with a fin which cools the dynamotor, because it is air-cooling, this brings about a further inconvenience of low cooling efficiency.

Furthermore, additional components include a housing and a connector. Further, an offtake of a terminal from the dynamotor is formed of many parts, including a connection ring, a terminal portion, and a terminal board. For that reason, the structure becomes complicated and expensive.

In order to obviate or at least minimize the aforementioned inconveniences, the present invention provides a propulsion unit for a vehicle including a dynamotor, which is driven by electrical energy and has generator functions and is directly connected to an engine driven by combustion of fuel. The dynamotor is composed of the motor rotor and the motor stator disposed for correspondence to the motor rotor, and a rotational displacement detection mechanism is provided which is composed of the sensor rotor, which detects rotational displacement of the motor rotor relative to the motor stator, and the sensor stator disposed for correspondence to the sensor rotor. A magnetic-proof member is provided between the dynamotor and the rotational displacement detection mechanism in order to shield the detection mechanism from magnetic flux and radio wave noise which leak or are emitted from the dynamotor.

Pursuant to the present invention, because the rotational displacement detection mechanism is shielded from the magnetic flux and the radio wave noise which leak from the dynamotor, noise in the rotational displacement detection mechanism is avoided or at least minimized. The noise occurring in the signal of the rotational displacement detection mechanism is thus reduced.

DETAILED DESCRIPTION

Embodiments of the present invention will now be described in specific detail with reference to the drawings.

FIGS. 1–4 illustrate a first embodiment of the present invention.

Figure 4:
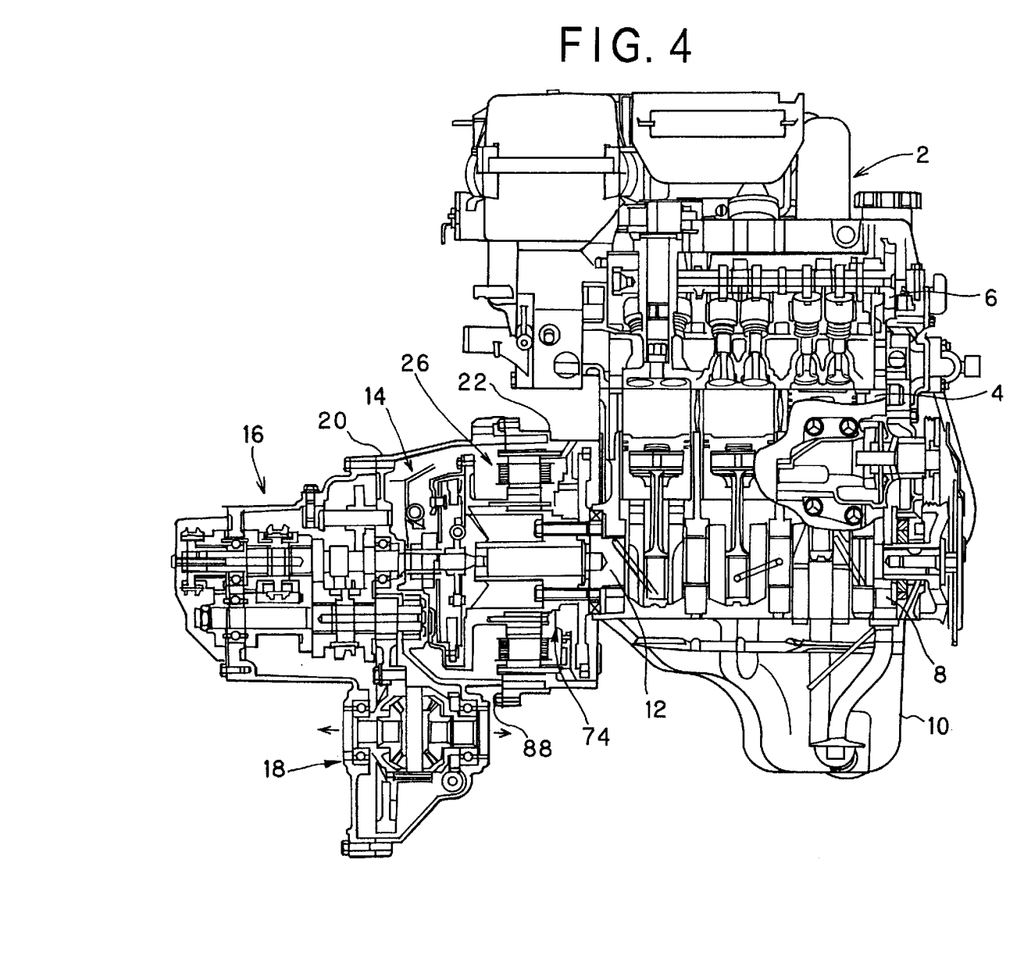
FIG. 4 is a cross-sectional view showing the engine, the transmission, and a differential machine.

In FIG. 4, reference numeral 2 denotes an engine disposed in a hybrid vehicle (not shown); 4 a cylinder block; 6 a cylinder head; 8 a crank lower case; 10 an oil pan; 12 a crankshaft; 14 a clutch; 16 a transmission; 18 a differential machine; 20 a transmission case; and 22 a motor case.

The engine 2 is driven by the combustion of fuel. The clutch 14 not only transmits engine output from the engine 2 side to the transmission 16 side but also disengages the engine 2 from the transmission 16. In the cylinder block 4 and the crank lower case 8, the transmission case 20 and the motor case 22 are tightened and fixed by means of a combination bolt 24.

Figure 1:
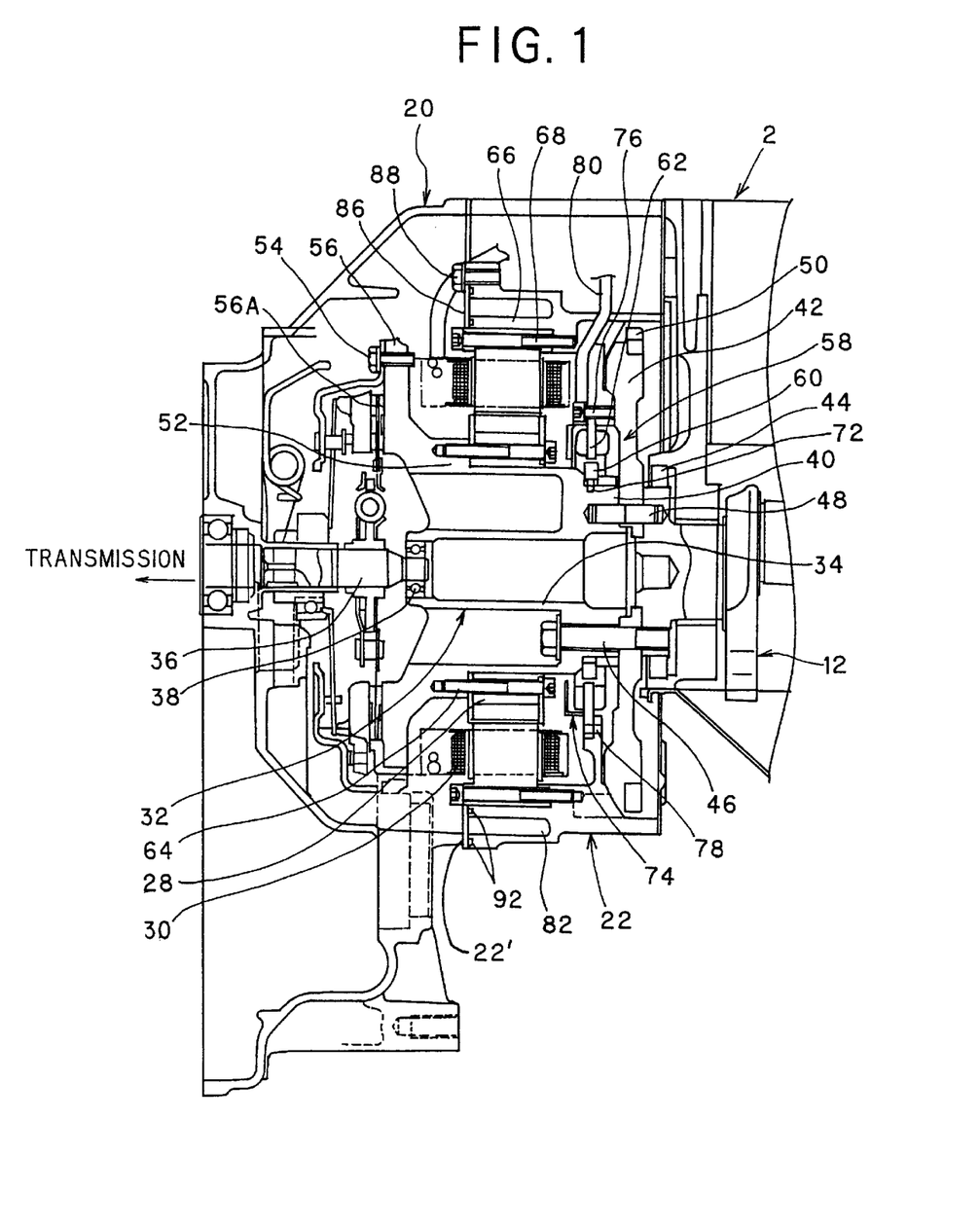
FIG. 1 is a cross-sectional view showing an engine and a dynamotor located between a transmission and a rotational displacement detection mechanism.

A dynamotor (a motor) 26 is directly connected to the crankshaft 12 and is positioned at the edge portion of one end of the transmission side of the motor case 22. The dynamotor 26 consists of a motor rotor 28, which is driven by electrical energy and has generator functions, and a motor stator (coil) 30, which is disposed for correspondence to the motor rotor 28. The dynamotor 26 is covered with the motor case 22 between the side of the cylinder block 6 and the transmission case 20. The dynamotor 26 is disposed between the side of the cylinder block 6 and the clutch 14. The clutch 14 is positioned at the side of the transmission 16.

One end of a middle shank portion 34 of a rotor mounting part 32 is disposed at one end of the crankshaft 12. The other end of the middle shank portion 34 maintains an input shaft 36 of clutch 14 by means of a ball bearing 38. A shank member flange portion 40 as well as a first flywheel 42 are tightened and fixed in a crank flange portion 44 of the crankshaft 12 by means of an axial bolt 46. The shank member flange portion 40 is disposed generally radially at the one end of the middle shank portion 34. The shank member flange portion 40 and the first flywheel 42 are positioned by means of a location pin 48. A starter gear 50 is fixed at the outer circumferential portion of the first flywheel 42.

At the outer edge portion of the shank member flange portion 40, a maintenance pipe or pipe-like portion 52 is fixed. The maintenance pipe portion 52 extends axially. The maintenance pipe portion 52 is provided with the second flywheel 56. The second flywheel 56 is radially oriented and defines a clutch side 56A. The second flywheel 56 is connected with the clutch 14 by means of a clutch connecting bolt 54.

In addition, in the motor case 22, a rotational displacement detection mechanism (a sensor) 58 is provided. The rotational displacement detection mechanism 58 consists of a sensor rotor 60 and a sensor stator (coil) 62 in order to detect-rotational displacement of the motor rotor 28 to or relative to the motor stator 30. The sensor stator (coil) 62 is disposed for correspondence to the sensor rotor 60. In the dynamotor 26, in an outer circumferential portion of maintenance pipe portion 52, the motor rotor 28 is mounted by means of a rotor mounting bolt 64 which is axially oriented, and the motor stator 30 is mounted by means of a stator mounting bolt 68 in a stator mounting portion 66. Also, the sensor rotor 60 of rotational displacement detection mechanism 58 is mounted on the outer circumferential portion of the shank member flange 40.

In the inner circumferential side of the sensor rotor 60, four key-ways (or slots) 70 are formed and are disposed circumferentially at even intervals from one another. The sensor rotor 60 is positioned on the rotor mounting part 32 mounted on the crankshaft 12 by means of a radially oriented first dowel 72 which is a first location member, and the motor rotor 28 is positioned by means of the rotor mounting bolt 64 which is a third location member.

In addition, sensor stator 62 of the rotational displacement detection mechanism 58 and a magnetic-proof plate or member 74 are tightened and installed in the motor case 22 by means of a mounting bolt 76. The magnetic-proof plate 74 is formed of non-magnetic material (for example, SUS304, aluminum alloy or copper alloy), or is formed of a double (multiple) construction of nonmagnetic material and magnetic material. In order to shield the magnetic flux and/or the radio wave noise which leak from the motor stator 30, the plate is formed with a thickness of, for example, more than about 1 mm and less than about 10 mm.

In the motor case 22, the sensor stator 62 is positioned by means of a second axially oriented dowel 78, which is a second location member, and the motor stator 30 is positioned by means of the stator mounting bolt 68 which is a fourth location member.

The sensor stator 62 of the rotational displacement detection mechanism 58 is connected to, for example, a signal line 80 which consists of shielded wire or twisted pair shielded wire.

In addition, at one end of the motor case 22, a water passage 82 is formed with a predetermined cirumferential length. The water passage 82 is connected to a cooling water pipe 84 at both of its terminal ends. The water passage 82 makes cooling water for the engine 2, which cools the dynamotor 26. The water passage 82 opens in one direction (or sidewardly in FIG. 1), and is formed by, for example, die casting.

A plate 86 is provided between the motor case 22 and the transmission case 20 which is connected to motor case 22, in order to block the water passage 82. The plate 86 is mounted at one end of the motor case 22 by means of a plate mounting bolt 88. In addition, between the motor case 22 and the plate 86 a sealing O-ring 92 is provided. The O-ring 92 is engaged within a ring groove 90 which is formed around the water passage 82 in the motor case 22. Adjacent the water passage 82, the plate 86 is mounted to the motor case 22 by means of the plate mounting bolt 88. In addition, the plate 86 is pressed down by means of a clamp 94 which is disposed between the top or head of the stator mounting bolt 68 and the plate 86 to securely mount the O-ring 92 and achieve an excellent seal.

Figure 2:
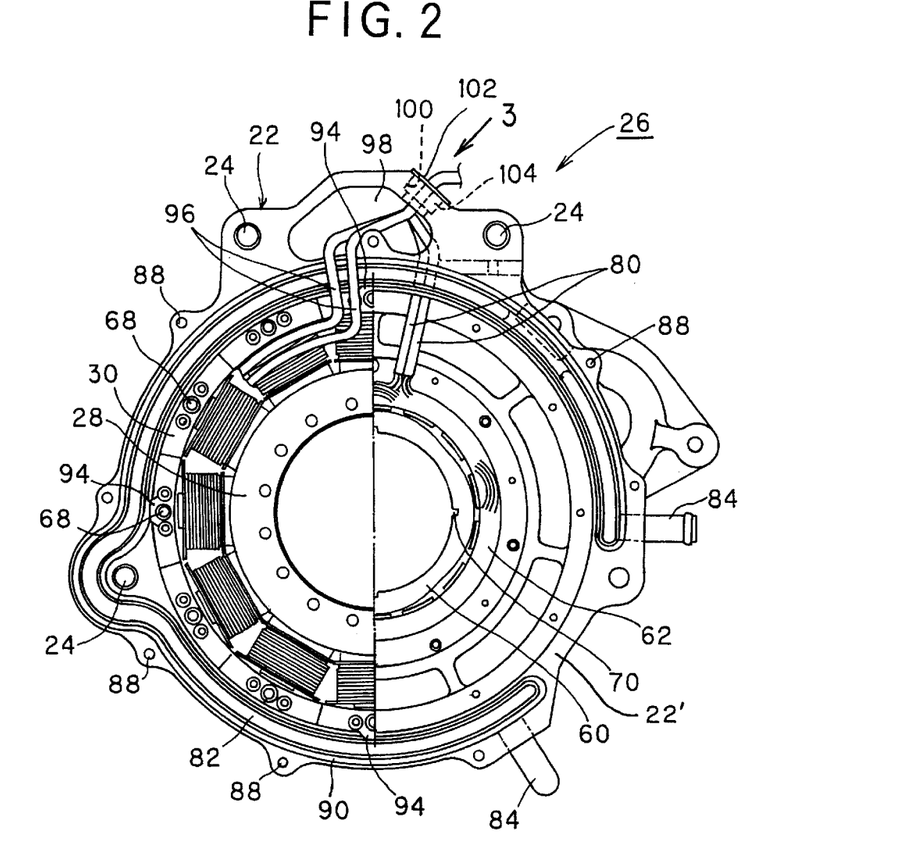
FIG. 2 is a cross-sectional view showing the dynamotor.
Figure 3:
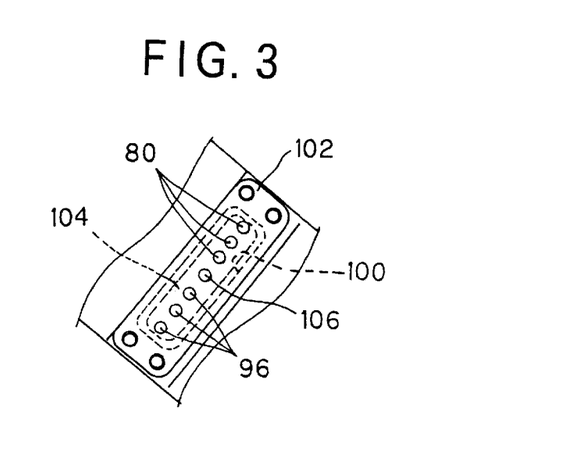
FIG. 3 is a view showing the dynamotor when viewed from the direction of arrow 3 in FIG. 2.

Also, as seen from FIGS. 2 and 3, an electrical wire 96, which is connected by means of the motor stator 30 to the dynamotor 26, and the signal line 80 of the rotational displacement detection mechanism 58 pass through a space 98 in the motor case 22. The electrical wire 96 and the signal line 80 are routed to the outside via a wire offtake 100 in the motor case 22 which includes a power cable plate 102 mounted on the motor case 22. In the wire offtake 100, a water-proof bush 104 is mounted which constitutes a water-proof member, so as to prevent entry of water or impurities such as dust. In addition, a temperature sensor cable 106 is disposed between the electrical wire 96 and the signal line 80. As a result, penetration of the noise of the electrical wire 96 in the dynamotor 26 into the output signal of the rotational displacement detection mechanism 58 can be avoided.

Next, the operation of the first embodiment will be described.

The magnetic flux and/or the radio wave noise, which leak from the dynamotor 26, are covered or shielded by the magnetic-proof plate 74, and the magnetic flux and/or the radio wave noise thus do not influence the rotational displacement detection mechanism 58. Accordingly, noise in the signal of the rotational displacement detection mechanism 58 can be reduced.

In addition, in the rotor mounting part 32, the motor rotor 28 and the sensor rotor 60 are positioned by means of the location member or the first dowel 72, and, in the motor case 22, the motor stator 30 and the sensor stator 62 are positioned by means of the location member or the second dowel 78. For that reason, when the rotor mounting part 32 is mounted on the crankshaft 12, and when the motor case 22 is mounted on the cylinder block 4, the relative positions of the dynamotor 26 and the rotational displacement detection mechanism 58 remain constant. Thus, positioning of each of the above components is unnecessary, a gap in signal is reduced to a minimum, no large adjustment is necessary, and the range of correction is small.

Furthermore, the dynamotor 26 can be cooled by means of the flow of cooling water in the water passage 82. Accordingly, cooling efficiency is improved, and the motor case 22 can be easily formed by die casting.

In addition, because a clamp 94 is installed between the top of the stator mounting bolt 68 and the plate 86, the clamp 94 applies pressure to the plate 86 and makes O-ring 92 stick to achieve excellent sealing.

Furthermore, because a temperature sensor cable 106 is installed between the electrical wire 96 and the signal line 80, noise from the electrical wire 96 in the dynamotor 26 penetrating into an output signal of the rotational displacement detection mechanism 58 can be avoided.

Figure 5:
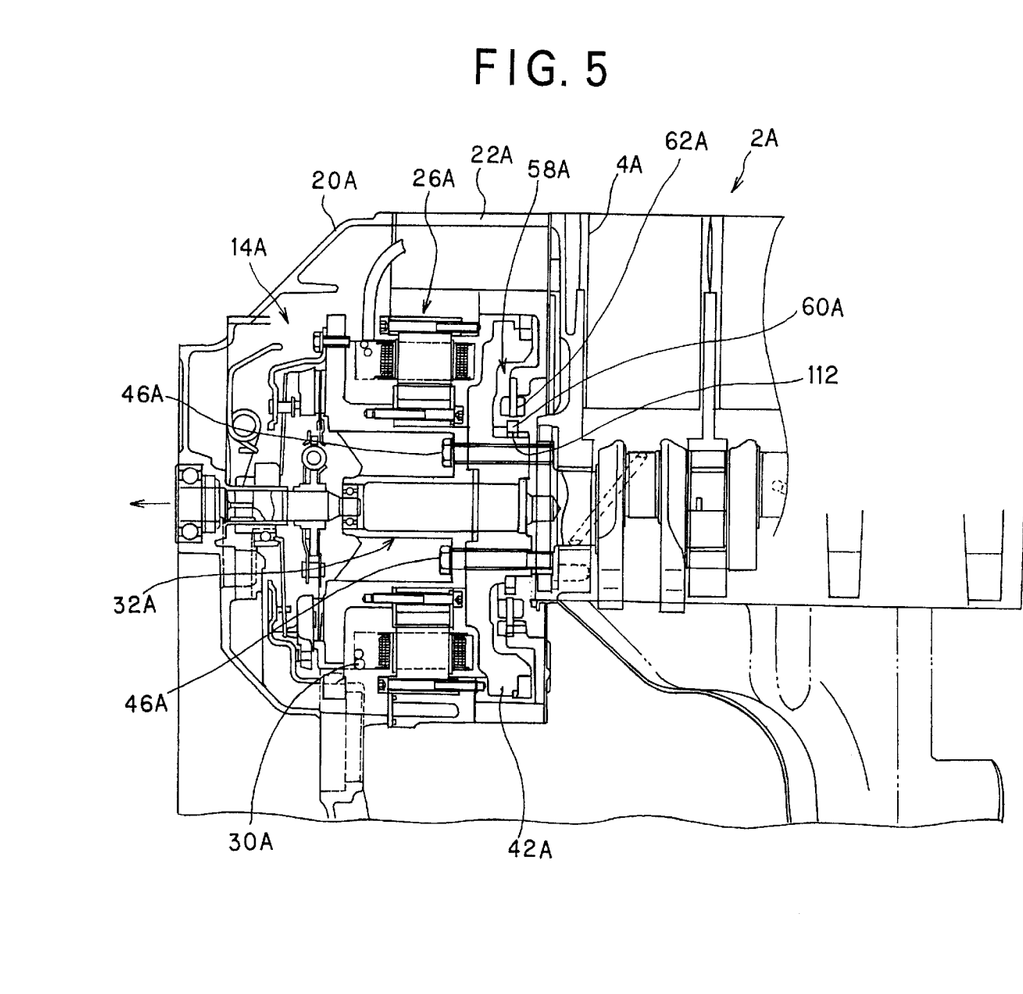
FIG. 5 is a cross-sectional view showing the engine and the dynamotor located between the transmission and the rotational displacement detection mechanism according to a second embodiment.

FIG. 5 illustrates a second embodiment of the present invention. In this embodiment, the same reference characters plus an "A" are utilized for components similar to or identical in function to those described in the first embodiment.

The second embodiment is characterized by the first flywheel 42A disposed between the motor stator 30A and the sensor stator 62A so as to function as a magnetic-proof member.

In addition, a key 112 which engages with a key-way or slot of sensor rotor 60A similar to slot 70 is provided in order to position the dynamotor 26A and the rotational displacement detection mechanism 58A.

In addition, the dynamotor 26A and the rotational displacement detection mechanism 58A can be positioned by means of a position jig similar to a dowel. The dowel is applied to the slot 70 and the sensor rotor 60A is mounted. The jig is then removed and the key 112 inserted into slot 70 to correctly position sensor rotor 60A.

Such a structure according to the second embodiment provides the same effect as the first embodiment. In addition, in the above structure according to the second embodiment the first flywheel 42A which is disposed between motor stator 30A and sensor stator 62A functions as a magnetic-proof member. As a result, a separate shielding member is unnecessary, a dowel is unnecessary, and the structure is simplified and inexpensive.

Figure 6:
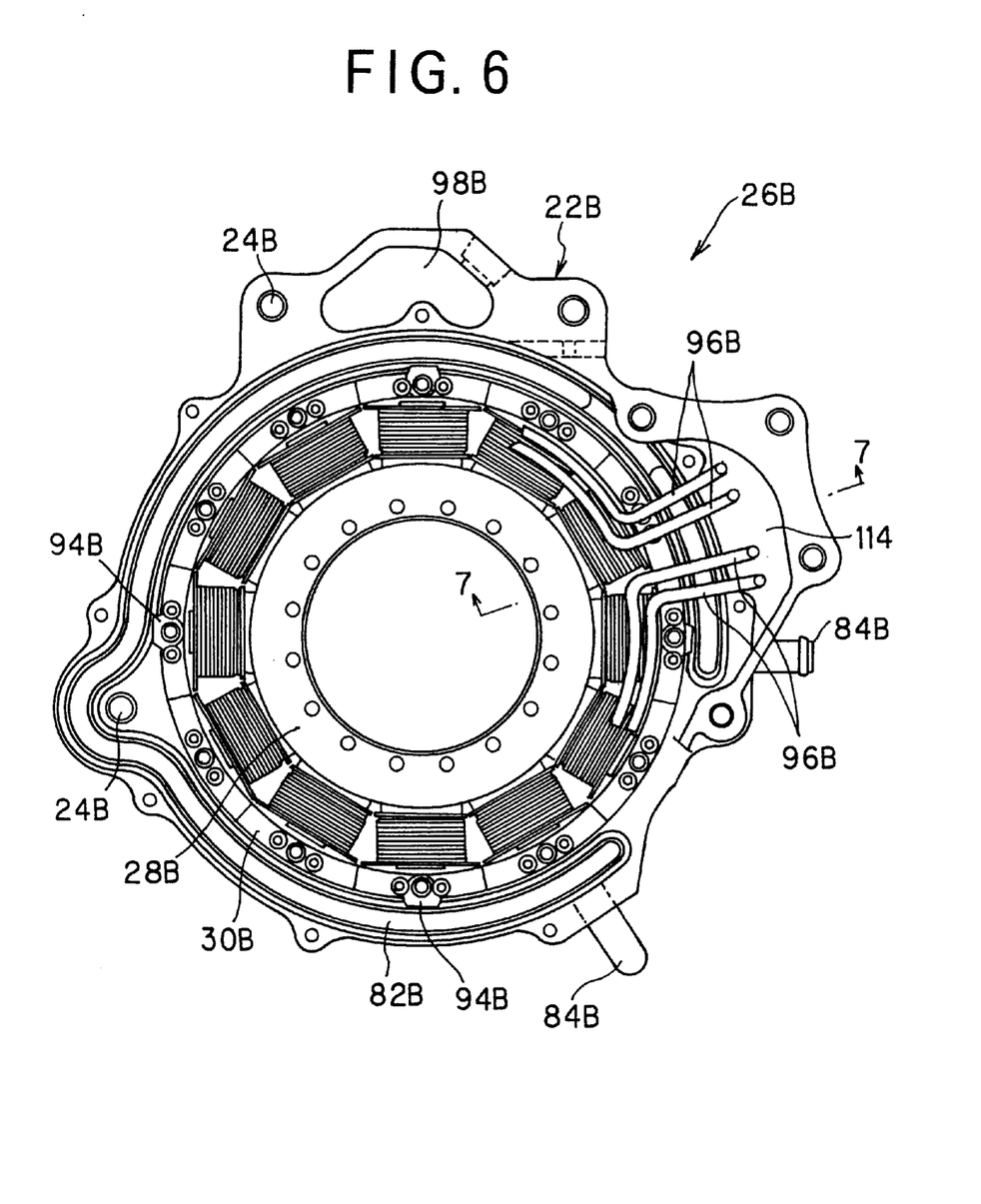
FIG. 6 is a cross-sectional view showing the dynamotor according to a third embodiment.
Figure 7:
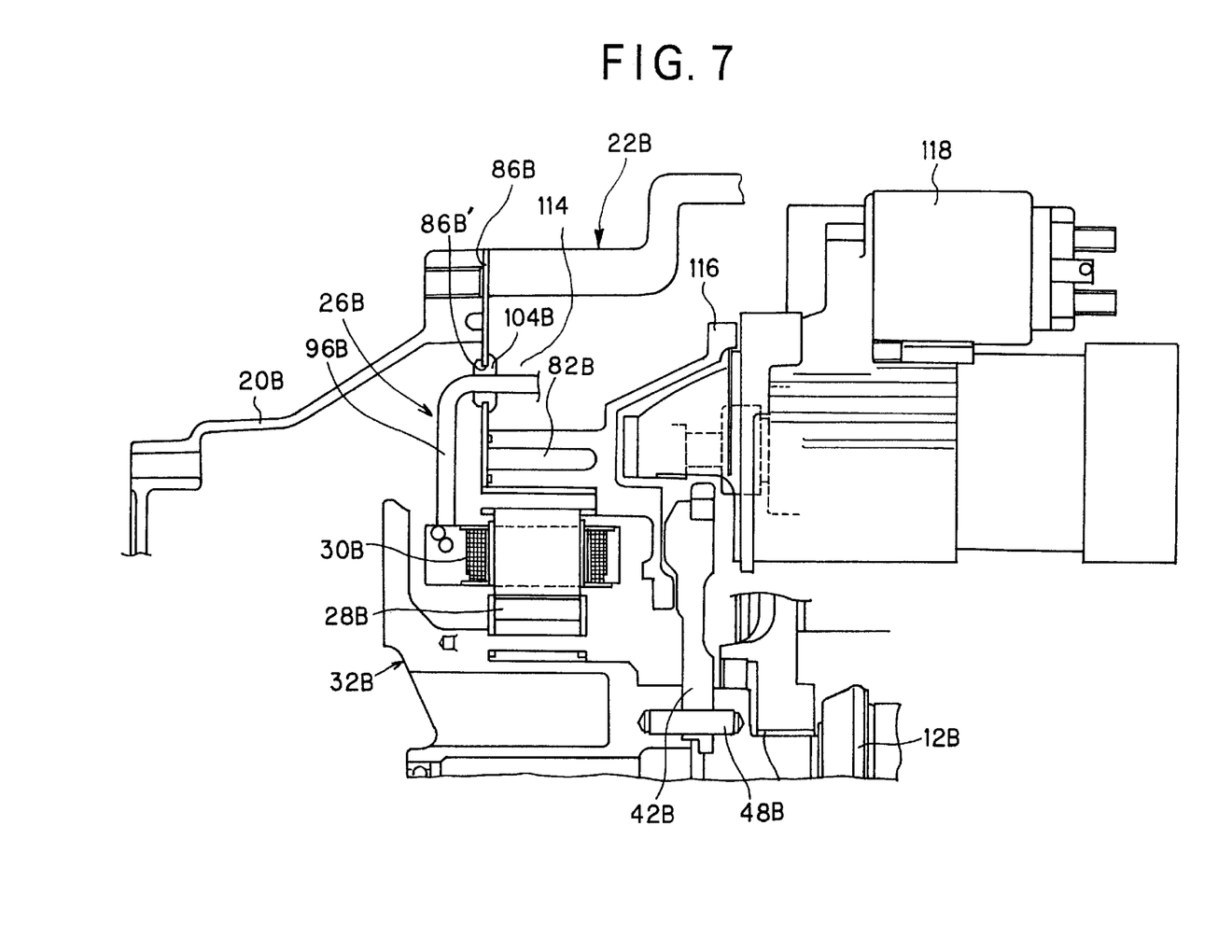
FIG. 7 is a cross-sectional view taken generally along line 7—7 of FIG. 6, showing the dynamotor.

FIGS. 6 and 7 illustrate the third embodiment of the present invention. The same reference characters plus a "B" are utilized for components similar to or identical in function to those described in the first embodiment.

The third embodiment is characterized in that the electrical wire 96B is routed to the outside through a starter mounting space 114 and a water-proof bush 104B. The starter mounting space 114 is positioned in the motor case 22B. The water-proof bush 104B is mounted in an opening 86B' of the plate 86B.

In FIG. 7, a starter motor attaching portion 116 is provided and connected to the motor case 22B, and a starter motor 118 is mounted to the starter motor attaching portion 116.

Such a structure according to the third embodiment provides the same effect as the first embodiment. In addition, because the electrical wire 96B can be routed to the outside from the plate 86B by using an existing starter mounting space 114, a structure can be formed of fewer components. In addition, because the former transmission 16B can be used, costs can be reduced.

Figure 8:
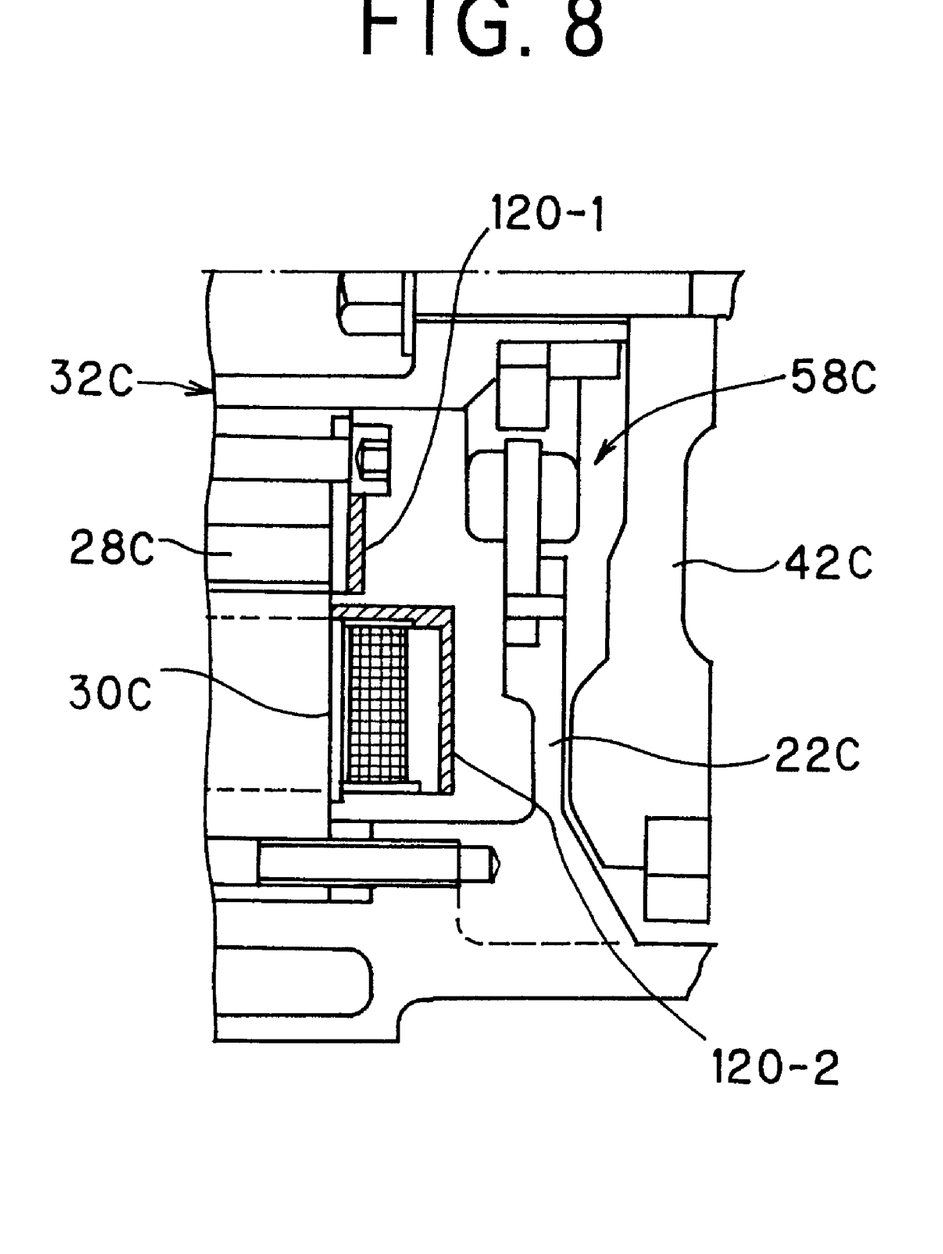
FIG. 8 is a fragmentary cross-sectional view showing the inside of the motor case according to the fourth embodiment.

FIG. 8 illustrates a special structure according to a fourth embodiment of the present invention. The same reference characters plus a "C" are utilized for components similar to or identical in function to those described in the first embodiment.

The fourth embodiment is characterized in that the motor rotor 28C and the motor stator 30C are directly provided with a rotor side shielding member 120-1 and a stator side shielding member 120-2 at the side of the rotational displacement detection mechanism 58C.

Such a structure according to the fourth embodiment avoids the necessity of disposing a separate shielding member between the dynamotor 26C and the rotational displacement detection mechanism 58C. As a result, space is formed in the motor case 22C and such a structure is thus advantageous from a spatial standpoint.

Figure 8A:
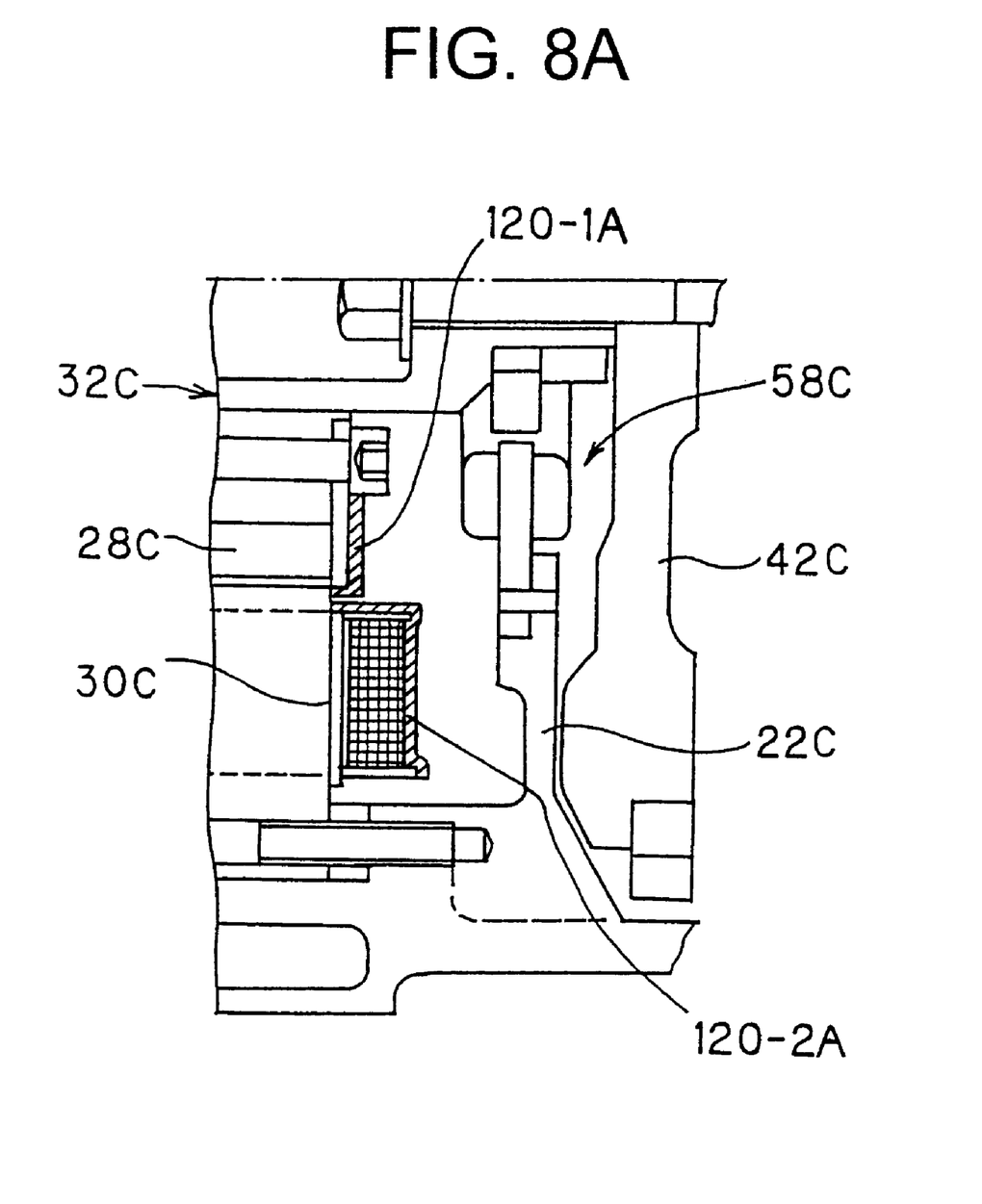
FIG. 8A is a fragmentary, cross-sectional view of a further embodiment similar to the embodiment of FIG. 8.

In addition, such a structure according to the fourth embodiment may be in the form of a coating which functions as a magnetic-proof member, so the structure can be formed of fewer components. The coating includes a magnetic-proof agent. That is, as shown in FIG. 8A, a rotor-side magnet-proof coating 120-1A is formed on the motor rotor 28C and a stator side magnet-proof coating 120-2A is formed on the motor stator 30C.

In addition, the present invention is not limited to the above embodiment.

Figure 9:
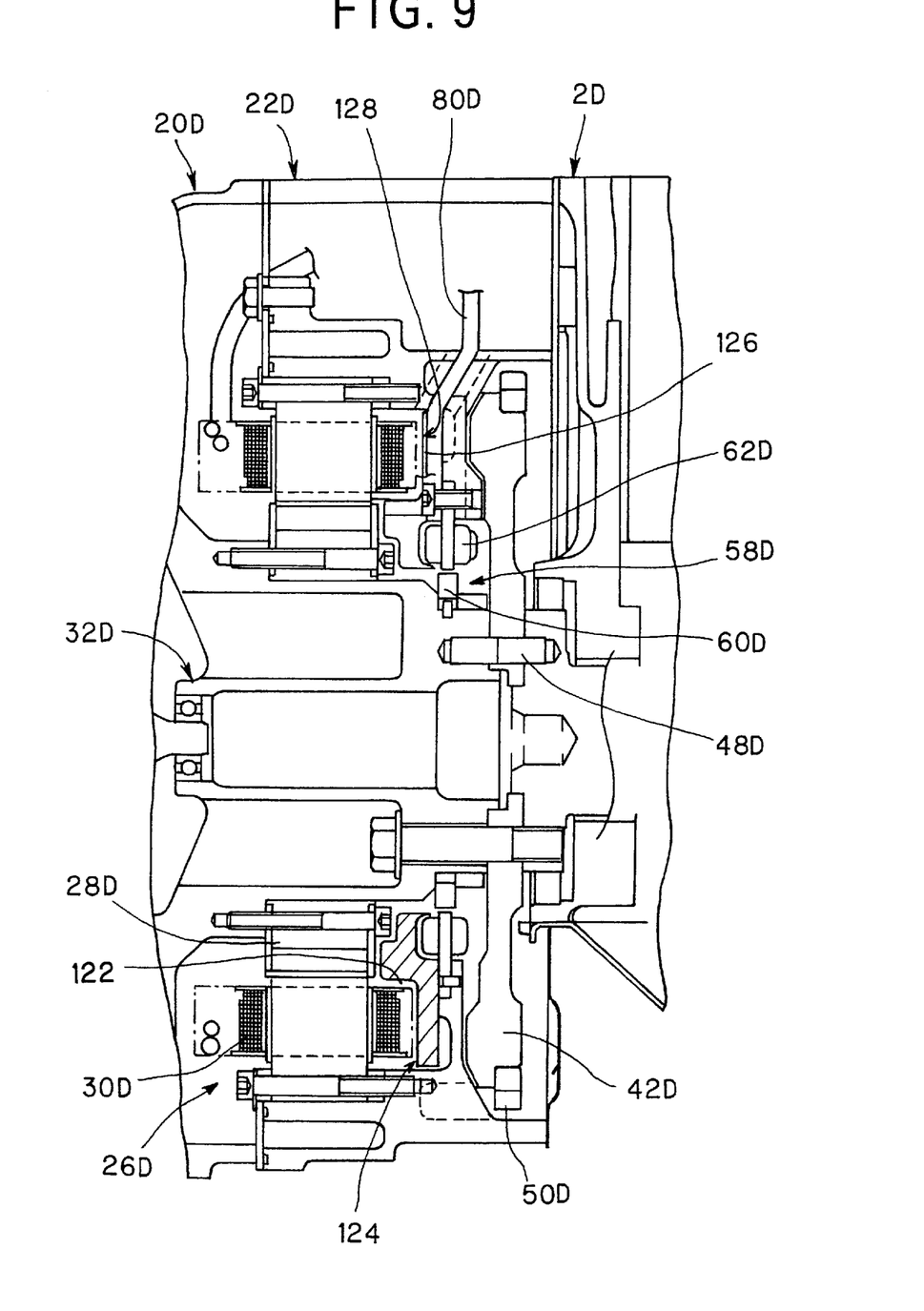
FIG. 9 is a cross-sectional view showing the inside of the motor case according to the fifth embodiment.

For example, as seen from the fifth embodiment shown in FIG. 9 (similar or identical components to those discussed above are referenced by the same numbers plus a "D"), a magnetic-proof member 124, which is mounted in the motor case 22D, is disposed in a space 122 between the dynamotor 26D and the rotational displacement detection mechanism 58D. The magnetic-proof member 124 is of a size which is as large as possible for the space 122. In addition, a line passage portion 128 provided in the magnetic-proof member 124 is formed with a shielding portion 126 so as to cover the signal line 80D from the dynamotor 26D side. As a result, the signal line 80D is covered by means of the shielding portion 126 of magnetic-proof member 124, and the signal line 80D can be an inexpensive single track instead of a shielding wire.

In addition, a sensor rotor 60D of the rotational displacement detection mechanism 58D is provided in the outer circumferential portion of the first flywheel 42D, and a sensor stator 62D is provided for correspondence to the sensor rotor 60D in the motor case 22D. As a result, the rotational displacement detection mechanism 58D is positioned away from the dynamotor 26D, and thus the negative influence of the magnetic flux can be reduced.

As evidenced by the above detailed description, pursuant to the present invention, the magnetic-proof member is provided between the dynamotor and the rotational displacement detection mechanism in order to cover same from the magnetic flux and the radio wave noise which leak from the dynamotor. As a result, the magnetic flux and the radio wave noise do not negatively influence the rotational displacement detection mechanism. Thus, the noise which occurs in the output signal of the rotational displacement detection mechanism can be reduced.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A propulsion unit of a vehicle including a dynamotor driven by electrical energy and having generator functions, the dynamotor being directly connected to an engine driven by the combustion of fuel, the engine including a cylinder block and a crankshaft having a rotor mounting part on one end thereof which defines an axially extending pipe-shaped portion, the dynamotor being covered by a motor case such that the dynamotor and the motor case are disposed between a side of the cylinder block and a transmission case, the dynamotor including a motor rotor mounted on the pipe-shaped portion and a motor stator mounted on the motor case adjacent the motor rotor, a rotational displacement detection mechanism including a sensor rotor and a sensor stator disposed adjacent the sensor rotor so as to detect the rotational displacement of the motor rotor relative to the motor stator, and a magnetic-proof member disposed between the dynamotor and the rotational displacement detection mechanism to shield the rotational displacement detection mechanism from magnetic flux and/or radio noise emitted from the dynamotor, wherein the sensor rotor is positioned on the rotor mounting part by a first positioning member, the sensor stator is positioned in the motor case by means of a second positioning member, the motor rotor is positioned on the pipe-shaped portion of the rotor mounting part by a third positioning member, and the motor stator is positioned in the motor case by means of a fourth positioning member.

2. A propulsion unit as defined in claim 1, wherein the rotational displacement detection mechanism is connected to a signal line made of shielded wire.

3. A propulsion unit as defined in claim 1, wherein the magnetic-proof member comprises a flywheel mounted on a crankshaft of the engine, the flywheel being disposed between the motor stator and the sensor stator.

4. A propulsion unit as defined in claim 1 wherein a sidewardly-opening water passage is formed in the motor case, the water passage being connected at opposite ends thereof to a cooling water pipe to permit the flow of cooling water to the dynamotor, a plate is disposed between the motor case and the transmission case fixed thereto to close off the water passage from the side, and a sealing element is disposed between the motor case and the plate.

5. A propulsion unit as defined in claim 4, wherein the plate is connected to the motor case by a bolt, and a clamping member is disposed between a head of the bolt and the plate so as to securely mount the sealing element on the motor case.

6. A propulsion unit as defined in claim 4 wherein a signal line is connected to the rotational displacement detection mechanism and passes through a space in the motor case and is routed outwardly from a wire offtake formed in the motor case, and a water-proof bush is disposed in the wire offtake.

7. A propulsion unit of claim 6 wherein a power cable plate is disposed in the wire offtake, an electrical wire connected to the dynamotor and the signal line are routed outwardly through the power cable plate, and a temperature sensor cable is routed outwardly through the power cable plate and is disposed between the electrical wire and the signal line.

8. A propulsion unit of claim 4 wherein an electrical wire is connected to the dynamotor and passes through a starter-mounting opening defined in the motor case, and a plate is disposed between the motor case and the transmission case, the plate defining an opening in which a water-proof bush is mounted, the electrical wire being routed outwardly from the starter-mounting opening through the water-proof bush.

9. A propulsion unit as defined in claim 1 wherein the first positioning member is a generally radially oriented dowel mounted within the rotor mounting part, the second positioning member is a generally axially oriented dowel mounted within the motor case, the third positioning member is a generally axially oriented bolt mounted within the pipe-shaped portion, and the fourth positioning member is a generally axially oriented bolt mounted within the motor case.

10. A propulsion unit as defined in claim 1 wherein the sensor rotor is mounted on the crankshaft for rotation therewith, and the sensor stator is mounted on the motor case.

11. A propulsion unit as defined in claim 1 wherein the motor case defines therein a passage which extends circumferentially about the motor stator, opposite terminal end portions of the passage communicating with a source of fluid to provide a flow of fluid through the passage to cool the dynamotor, the passage opening sidewardly through a generally vertically oriented surface of the motor case and being closed off by a generally vertically oriented plate fixed between the motor case and the transmission case.

12. A propulsion unit of a vehicle including a dynamotor driven by electrical energy and having generator functions, the dynamotor being directly connected to an engine driven by the combustion of fuel and being composed of a motor rotor and a motor stator disposed adjacent the motor rotor, and a rotational displacement detection mechanism including a sensor rotor and a sensor stator disposed adjacent the sensor rotor so as to detect the rotational displacement of the motor rotor relative to the motor stator, a magnetic-proof member disposed between the dynamotor and the rotational displacement detection mechanism to shield the rotational displacement detection mechanism from magnetic flux and/or radio noise emitted from the dynamotor, the magnetic-proof member comprising a shielding member mounted on each of the motor rotor and the motor stator on sides thereof which face the rotational displacement detection mechanism.

13. A propulsion unit as defined in claim 12, wherein the shielding member each comprise a magnetic-proof coating applied to the respective motor stator and the motor rotor.

* * * * *